United States Patent
Tanaka

(10) Patent No.: US 7,865,816 B2
(45) Date of Patent: Jan. 4, 2011

(54) SYSTEM FOR DISPLAYING ADDITIONAL INFORMATION ADDED TO AN ELECTRONIC DOCUMENT

(75) Inventor: Kei Tanaka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 241 days.

(21) Appl. No.: 11/073,613

(22) Filed: Mar. 8, 2005

(65) Prior Publication Data

US 2005/0268220 A1 Dec. 1, 2005

(30) Foreign Application Priority Data

May 25, 2004 (JP) .............................. 2004-154583

(51) Int. Cl.
*G06F 17/24* (2006.01)
*G06F 3/00* (2006.01)

(52) U.S. Cl. ...................... 715/230; 715/229; 715/255; 715/753

(58) Field of Classification Search ................ 715/515, 715/512, 514, 516, 530, 531, 511, 513, 230–233, 715/203, 255, 234, 751, 204, 753, 759, 229; 707/8, 203; 709/217, 223
See application file for complete search history.

(56) References Cited

U.S. PATENT DOCUMENTS

| | | | | |
|---|---|---|---|---|
| 5,337,407 A | * | 8/1994 | Bates et al. | 715/751 |
| 5,600,775 A | * | 2/1997 | King et al. | 715/500 |
| 5,835,713 A | * | 11/1998 | FitzPatrick et al. | 709/204 |
| 5,938,724 A | * | 8/1999 | Pommier et al. | 709/205 |
| 5,944,785 A | * | 8/1999 | Pommier et al. | 709/205 |
| 5,966,512 A | * | 10/1999 | Bates et al. | 709/205 |
| 6,008,804 A | * | 12/1999 | Pommier et al. | 715/753 |
| 6,173,287 B1 | * | 1/2001 | Eberman et al. | 707/102 |
| 6,339,431 B1 | * | 1/2002 | Ohmori et al. | 345/619 |
| 6,342,906 B1 | * | 1/2002 | Kumar et al. | 715/751 |
| 6,453,333 B1 | * | 9/2002 | Glynias et al. | 709/202 |
| 6,529,905 B1 | * | 3/2003 | Bray et al. | 707/8 |
| 6,546,405 B2 | * | 4/2003 | Gupta et al. | 715/512 |
| 6,687,878 B1 | * | 2/2004 | Eintracht et al. | 715/512 |
| 6,918,095 B1 | * | 7/2005 | Agnes et al. | 715/849 |
| 7,065,249 B2 | * | 6/2006 | Fushiki et al. | 382/167 |

(Continued)

FOREIGN PATENT DOCUMENTS

JP 09-081099 A1 3/1997

(Continued)

*Primary Examiner*—Adam L Basehoar
(74) *Attorney, Agent, or Firm*—Sughrue Mion, PLLC

(57) ABSTRACT

An information processing apparatus has an additional information adding unit, a display, an acquisition unit, a status determination unit, and a display control unit. The additional information adding unit adds additional information to an electronic document. The display displays the electronic document and the additional information added to the electronic document. The acquisition unit acquires, in a state where the electronic document is being displayed by the display unit, additional information added to the electronic document by another information processing apparatus. The status determination unit determines whether or not a user is unhindered in referencing the additional information added by the other information processing apparatus. The display control unit controls the display to display the additional information acquired by the acquisition unit when it has been determined by the status determination unit that the user is unhindered in the referencing.

15 Claims, 9 Drawing Sheets

U.S. PATENT DOCUMENTS

| | | | |
|---|---|---|---|
| 7,111,230 B2* | 9/2006 | Euchner et al. | 715/232 |
| 7,356,563 B1* | 4/2008 | Leichtling et al. | 709/204 |
| 7,363,589 B1* | 4/2008 | Maeng | 715/751 |
| 7,370,269 B1* | 5/2008 | Prabhu et al. | 715/230 |
| 7,373,590 B2* | 5/2008 | Woolf et al. | 715/230 |
| 2003/0135565 A1* | 7/2003 | Estrada | 709/206 |
| 2004/0021685 A1* | 2/2004 | Denoue et al. | 345/721 |
| 2004/0181592 A1* | 9/2004 | Samra et al. | 709/220 |
| 2005/0210392 A1* | 9/2005 | Koide et al. | 715/751 |
| 2006/0150079 A1* | 7/2006 | Albornoz et al. | 715/512 |
| 2007/0011155 A1* | 1/2007 | Sarkar | 707/5 |
| 2007/0061296 A1* | 3/2007 | Burke et al. | 707/3 |
| 2007/0288839 A1* | 12/2007 | Kurosawa | 715/512 |
| 2009/0204882 A1* | 8/2009 | Hollander et al. | 715/230 |

FOREIGN PATENT DOCUMENTS

| | | |
|---|---|---|
| JP | 2000-105731 A1 | 11/2000 |
| JP | 2003-196243 A | 7/2003 |

* cited by examiner

FIG. 3

| DOCUMENT ID | DOCUMENT NAME | DOCUMENT BODY |
|---|---|---|
| 0000 | doc001.txt | 1. Introduction ... |
| 0001 | doc002.txt | This material ... |
| 0002 | doc003.txt | The budget for this fiscal year ... |
| ⋮ | ⋮ | ⋮ |

FIG. 4

| ANNO-TATION ID | TERMINAL ID | DOCUMENT ID | POSITION INFORAMTION | DISPLAY NAME | LINK | PUBLIC ATTRIBUTE | STATUS | DATE AND TIME CREATED |
|---|---|---|---|---|---|---|---|---|
| 0001 | 0011 | 0002 | p1 52-92 | ITEM A | http://MessageServer/threadViewer?Messageid=1517 | FRD | EXIST | 2004/03/05 19:10:15 |
| 0002 | 0012 | 0002 | p2 120-160 | ITEM B | http://MessageServer/threadViewer?Messageid=1518 | FRD | EXIST | 2004/03/06 17:25:45 |
| 0003 | 0012 | 0002 | p3 222-262 | ITEM C | http://MessageServer/threadViewer?Messageid=1519 | FRD | EXIST | 2004/03/06 18:18:23 |
| ....... | ....... | ....... | ....... | ....... | ....... | ....... | ....... | ....... |

FIG. 5

| ANNO-TATION ID | TERMINAL ID | DOCUMENT ID | POSITION INFOR-AMTION | ANNO-TATION CONTENT | COLOR AND SHAPE | LINE TYPE | PUBLIC ATTRIBUTE | STATUS | DATE AND TIME CREATED |
|---|---|---|---|---|---|---|---|---|---|
| 0101 | 0011 | 0002 | p1 11-14, 51, 54 91-94 | IMAGE INFOR-MATION 1 | RED, SQUARE | NARROW 1 | FRD | DELETED | 2004/03/05 19:25:34 |
| 0102 | 0012 | 0002 | p1 159-183 | IMAGE INFOR-MATION 2 | YELLOW | EXTRA THICK 1 | PRIV | EXIST | 2004/03/06 12:18:11 |
| 0103 | 0012 | 0002 | p3 231-256 | IMAGE INFOR-MATION 3 | YELLOW | EXTRA THICK 1 | PRIV | EXIST | 2004/03/06 13:23:45 |
| ....... | ....... | ....... | ....... | ....... | ....... | ....... | ....... | ....... | ....... |

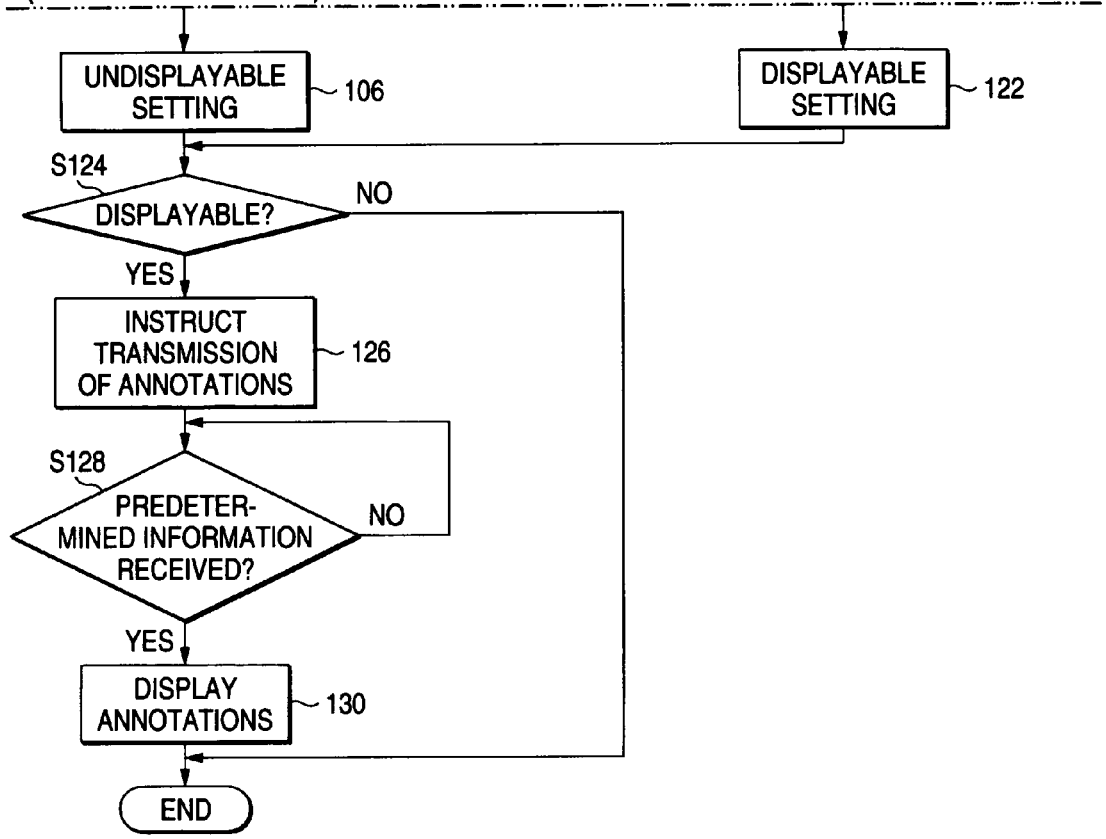

SYSTEM FOR DISPLAYING ADDITIONAL INFORMATION ADDED TO AN ELECTRONIC DOCUMENT

The entire disclosure of Japanese Patent Application No. 2004-154583 filed on May 25, 2004 including specification, claims, drawings and abstract is incorporated herein by reference in its entirety.

BACKGROUND OF THE INVENTION

1. Field of the Invention

The present invention relates to an information process apparatus, an information processing method, and a recording medium in which an information processing program is recorded. In particular, the present invention relates to an information processing apparatus having the function of adding additional information to an electronic document, an information processing method of the information processing apparatus, and a recording medium in which an information processing program executed in the information processing apparatus is recorded.

2. Description of the Related Art

In recent years, technology has become widely used for adding additional information such as character information, image information, audio information and link information to optional positions on an electronic document without affecting the body of that electronic document. In the present specification, such additional information will be called annotations.

Examples of systems that can add annotations to an electronic document include DocuWorks (registered trademark) of Fuji Xerox Co., Ltd., and Acrobat (registered trademark) of Adobe Systems Incorporated.

In such systems that can add annotations to an electronic document, modes of use are conceivable where annotations are added to a common electronic document by plural users using plural information processing apparatus that each include the function of adding annotations to an electronic document. Examples of such cases include when a common electronic document such as a device manual is edited by plural editors and when collaborative work is done in conferences or meetings while referencing a common electronic document such as a plan.

In such cases, it is desired to display, in real time, annotations added by other users in all of the information processing apparatus that the users are using, so that all of the users are aware of the annotations to the electronic document being referenced; however, there are also cases where, depending on the status of the user, the user wishes to postpone the display of the annotations, such as when a particular user is personally adding an annotation.

As conventional technology that can accommodate this, there has been technology where, in a status notification system such as a buddy list system or an instant messaging system, an "action rule" for changing the manner of display of the status information of buddies and an "application status" representing a status where the action rule is applied are stored in advance with the purpose of realizing, while suppressing the operational burden of the user, the display of status information corresponding to the statuses of the users, and the display of the status information is changed in accordance with the action rule corresponding to the application status only when the status is one corresponding to the application status (e.g., see JP-A-2003-196243).

When this technology is applied to postpone the display of an annotation added by another user, a status when it is all right for the user to display the annotation (e.g., a status where the user is not personally adding an annotation) is stored in advance as the application status.

However, there have been problems in that when this technology is applied to postpone the display of an annotation added by another user, it is necessary for the user to appropriately store the application status, and the operation for this is cumbersome.

SUMMARY OF THE INVENTION

The present invention has been made in order to address this problem and provides an information processing apparatus, an information processing method, and a recording medium in which an information processing program is recorded which can appropriately switch between displaying and not displaying additional information added by another user without entailing a cumbersome operation.

The information processing apparatus according to an aspect of the present invention includes an additional information adding function that adds additional information to an electronic document. The information processing apparatus is configured by: a display unit that displays the electronic document and the additional information added to the electronic document; an acquisition unit that acquires, in a state where the electronic document is being displayed by the display unit, additional information added to the electronic document by another information processing apparatus including the additional information adding function; a status determination unit that determines whether or not the user is unhindered in referencing the additional information added by the other information processing apparatus; and a display control unit that controls the display unit to display the additional information acquired by the acquisition unit when it has been determined by the status determination unit that the user is unhindered in the referencing.

BRIEF DESCRIPTION OF THE DRAWINGS

An embodiment of the invention will be described in detail below on the basis of the following figures, wherein:

FIG. 3 is a schematic diagram showing an example of the structure of data in a document database pertaining to the embodiment of the invention;

FIG. 4 is a schematic diagram showing an example of the structure of data in a label-use annotation database pertaining to the embodiment of the invention;

FIG. 5 is a schematic diagram showing an example of the structure of data in a pen input-use annotation database pertaining to the embodiment of the invention;

DETAILED DESCRIPTION OF THE INVENTION

An embodiment of the invention will be described in detail below with reference to the drawings. Here, a case will be described where an information processing apparatus, an information processing method and a recording medium in which an information processing program according to an embodiment of the invention is recorded are applied to an information processing system configured as a client/server system.

Figure 1:
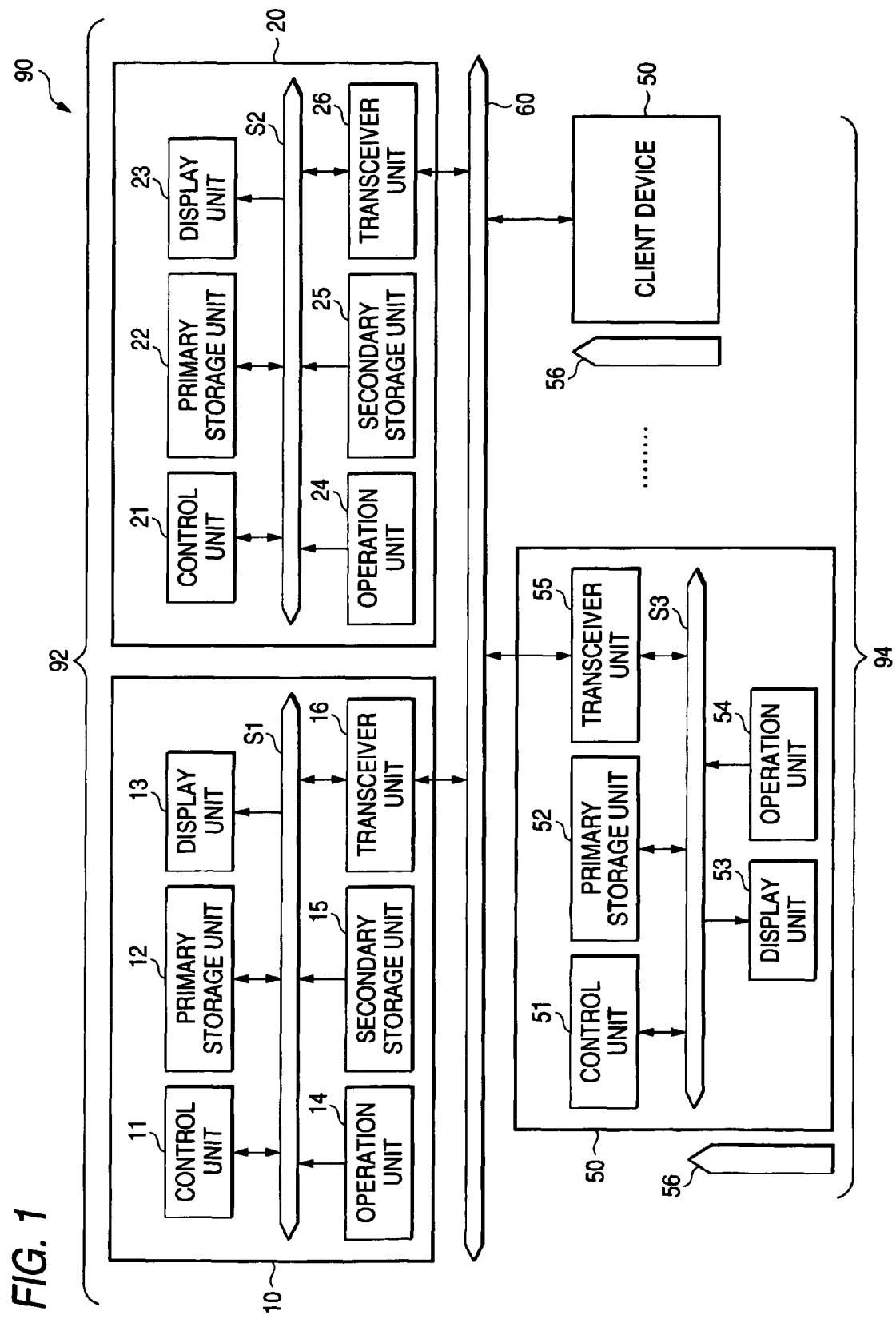
FIG. 1 is a schematic diagram showing the overall configuration of an information processing system pertaining to an embodiment of the invention.

FIG. 1 is a diagram showing the overall configuration of an information processing system 90 pertaining to the present embodiment.

As shown in FIG. 1, the information processing system 90 includes a server system 92, which processes electronic data (not limited to document data; includes all other electronic data accommodated by the information processing system 90) used in the information processing system 90, and a client system 94 used by users of the information processing system 90.

The server system 92 includes a document management server 10 that manages electronic documents and an annotation management server 20 that manages annotations. The document management server 10 is a server that mainly saves and searches documents, and the annotation management server 20 is a server that mainly saves and searches annotations added to documents.

In this manner, by disposing the document management server 10 that manages entire documents and the annotation management server 20 that manages annotations added to electronic documents, instances where contradictions arise in the content of final electronic documents or corrections can be avoided even when corrections with respect to plural electronic documents are independently made by plural users.

For example, even when a user adds a supplementary explanation as an annotation to a certain portion of an original of an electronic document and then another user adds a correction to delete that same portion, the information can be managed without contradictions arising in the content of the electronic document body or corrections corresponding thereto by associating those edited portions with the electronic document body managed by the document management server 10 and registering them in advance in the annotation management server 20.

As shown in FIG. 1, the document management server 10 includes: a control unit 11 that controls the operation of the entire document management server 10; a primary storage unit 12 for storing various information; a display unit 13 including a display such as a liquid crystal display; an operation unit 14 including a keyboard and a mouse (pointing device); a secondary storage unit 15 for storing a later-described document database DB1, various programs and various parameter information; and a transceiver unit 16 that controls the transmission and reception of various information between the document management server 10 and outside devices. These units are electronically connected through a system bus S1. The document management server 10 according to the embodiment may be configured by an ordinary personal computer (also called a "PC" below).

The annotation management server 20 includes: a control unit 21 that controls the operation of the entire annotation management server 20; a primary storage unit 22 for storing various information; a display unit 23 including a display such as a liquid crystal display; an operation unit 24 including a keyboard and a mouse (pointing device); a secondary storage unit 25 for storing a later-described label-use annotation database DB2, a pen input-use annotation database DB3, various programs and various parameter information; and a transceiver unit 26 that controls the transmission and reception of various information between the annotation management server 20 and outside devices. These units are electronically connected through a system bus S2. The annotation management server 20 according to the embodiment may be also configured by an ordinary PC.

The client system 94 includes client devices 50 disposed for each user of the information processing system 90 and pen-type annotation devices 56 used when conducting pen input with respect to the client devices 50.

As shown in FIG. 1, the client device 50 includes: a control unit 51 that controls the operation of the entire client device 50; a primary storage unit 52 for storing various information; a display unit 53 including a display; an operation unit 54 including a keyboard and a mouse; and a transceiver unit 55 that controls the transmission and reception of various information between the client device 50 and outside devices. These units are electronically connected through a system bus S3.

The client device 50 is configured to display images on the display unit 53 on the basis of data read from the primary storage unit 52 and data acquired from the server system 92 through the transceiver unit 55.

The client device 50 is configured as a tablet PC using a display unit 53 disposed with a touch panel display configured by a touch panel (omitted from the drawings) being overlaid on the display surface. The user can directly input instructions (handwritten input) on the display surface of the display unit 53 with the annotation device 56.

Here, it suffices for the controller corresponding to the handwritten input to be a controller for recognizing and processing data inputted by handwriting as "digital ink (handwritten characters)", and it is not invariably necessary for the controller to include a function for converting handwritten inputted data into text (handwritten character recognition function). In this case also, the data can be handled as a high-order format of text, handwritten characters can be searched as they are and characters can be processed (colors can be changed, etc.). The digital ink data format may also be handled as image data (e.g., bitmap data).

In this manner, the client device 50 is configured so that the user can conduct handwritten input using the annotation device 56 similar to when the user freely adds marks such as underlines and circles to, or writes comments in, a paper document when reading that document.

In addition to the handwritten input function using the annotation device 56, the client device 50 is also disposed with a label adding function that can change the status where a document is displayed by the display unit 53 to a status where labels of a predetermined shape (in the present embodiment, a rectangle) are added to an optional position on the document. Here, optional comments can be directly described in the label, and link information representing links to comments and related articles can be associated with the label. When link information is associated with the label, a mark of a predetermined shape (in the present embodiment, a square) representing the fact that a link is added to that label is displayed. In this case, in the information processing system 90 pertaining to the present embodiment, the label itself is an annotation.

In this manner, the client device 50 can switch to a state where labels have been added to optional positions, such as noteworthy places or places requiring supplementary explanation, similar to when the user sticks labels to a paper document when reading that document.

The information processing system 90 is configured by the document management server 10, the annotation management server 20 and the plural client devices 50 being electronically connected to a network 60 via the transceiver units disposed in each. The information processing system 90 uses the Internet as the network 60, but the system is not limited thereto; the information processing system 90 can also use, individually or in combination, various networks such as an intranet, a local area network (LAN), a value added network (VAN), a telephone line network, ECHONET, or HomePNA.

The document management server 10 and the annotation management server 20 function as Hypertext Transfer Protocol (HTTP) servers, and the client devices 50 function as HTTP clients. The document management server 10, the annotation management server 20 and the client devices 50 can access each other through the network 60.

Additionally, in each of the client devices 50, information relating to annotations handwritten-inputted using the annotation device 56 (also called "handwritten-inputted annotations" below) and annotations added as labels (also called "label annotations" below) is temporarily retained in the primary storage unit 52, transmitted at a predetermined timing to the annotation management server 20 through the network 60, and associated and stored with a document body. Thereafter, in each client device 50, when that document is read, the information relating to the annotations added in the past is read and displayed by the display unit 53 together with the document body.

Figure 2:
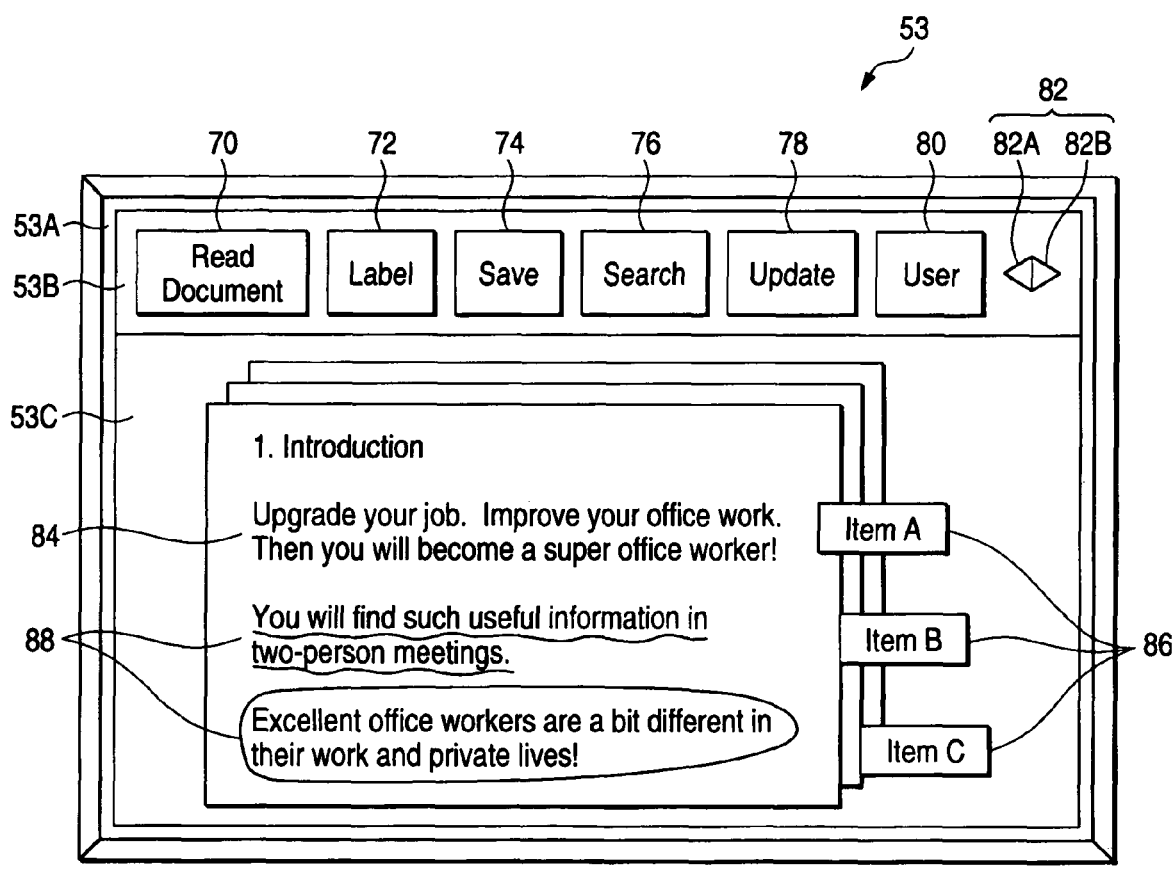
FIG. 2 is a schematic diagram showing an example of the configuration of a display screen resulting from a display unit of a client device pertaining to the embodiment of the invention.

FIG. 2 is a diagram showing the schematic configuration of a display screen resulting from the display unit 53 of the client device 50 according to the present embodiment.

As shown in FIG. 2, a display area 53A of the display unit 53 of the client device 50 is disposed with a button display area 53B for displaying plural buttons having predetermined roles and a document display area 53C for displaying a document 84.

In the client device 50, as the plural buttons, a document reading button 70 designated when reading a document managed (stored) in the document management server 10, a label button 72 designated when adding a label annotation to a document, a save button 74 designated when saving a label annotation 86 or a handwritten-inputted annotation 88 displayed in the document display area 53C, and a search button 76 designated when searching, and displaying the annotations managed (stored) in the annotation management server 20 in the document display area 53C, are displayed in the button display area 53B.

Moreover, as the plural buttons, an update button 78 designated when updating the display content of the document display area 53C, a user button 80 designated when displaying a list of the users adding annotations to the document being displayed in the document display area 53C, and a page turn button 82 comprising a previous page button 82A and a next page button 82B for turning the pages of the displayed document forward or backward are displayed in the button display area 53B.

The client device 50 is disposed with a function (page turn display function) for switching the display in page units while turning the page like reading a book. The client device 50 is configured so that, by using this page turn display function, the user can quickly search for desired information from among the large amount of incorporated information.

Namely, the client device 50 is configured so that when the user of the client device 50 searches for information, the user can display desired page information on the display unit 53 while turning the page by using the annotation device 56 and the keyboard and mouse of the operation unit 54 to point to and designate the two buttons of the previous page button 82A and the next page button 82B.

The client device 50 is also configured to execute the functions allocated to the buttons other than the page turn buttons 82 as a result of the user using the annotation device 56 and the keyboard and mouse of the operation unit 54 to point to and designate those buttons.

The client device 50 according to the present embodiment is configured so that software buttons for executing various functions are disposed by displaying the buttons in the display area 53A of the display unit 53 as described above; however, instead of this, the client device 50 can also be configured so that hardware buttons are disposed in the display unit 53 and the operation unit 54, and predetermined keys on the keyboard of the operation unit 54 can be used as the various buttons.

The document management server 10 according to the present embodiment handles "registration" and "document reading" in accordance with an instruction from the outside.

The "registration" is added from the outside by a path to a directory or a path such as a Uniform Resource Locator (URL) to a document to be registered showing an address representing a saving destination of the document in the document database DB1.

The document management server 10 successively adds document IDs to documents (groups) represented by the given paths and registers a document name and document body in the document database DB1 for each document ID. At this time, the structure of the data in the document database DB1 is as shown in FIG. 3, for example. Here, the document name or the document body may also be the path to the document such as a URL.

Then, when one of the client devices 50 detects that the document reading button 70 has been designated, then that client device 50 notifies the document management server 10 of information representing that fact. In response thereto, the document management server 10 creates a list of the names of the documents in the document database DB1 and transmits the list of the document names to the access source client device 50.

In response thereto, the client device 50 displays the list of document names in a list box or the like and prompts the user to make a selection. In response thereto, when the user uses the annotation device 56 or the keyboard or mouse of the operation unit 54 to point to and designate the desired document name, the client device 50 transmits the designated document name to the document management server 10.

In response thereto, the document management server 10 reads, from the document database DB1, the document body and document ID corresponding to the document name received from the client device 50, and transmits the document body and document ID to the client device 50. Thus, the body of the document corresponding to the designated document name is displayed in the document display area 53C of the display unit 53 of the client device 50.

The annotation management server 20 handles "saving" and "searching" in accordance with an instruction from the outside.

Namely, when an annotation is added to a document in a state where that document is being displayed by the display unit 53 in one of the client devices 50 and it is detected that the save button 74 has been designated, then that client device 50 notifies the annotation management server 20 of information representing that fact. Thus, the annotation management server 20 correlates, with the document to which the annotation has been added, information relating to the annotation for which saving has been instructed. When the annotation is a label annotation, the annotation management server 20 registers (saves) the annotation in the label annotation database DB2, and when the annotation is a handwritten-inputted annotation, the annotation management server 20 registers (saves) the annotation in the pen input-use annotation database DB3.

Namely, for example, when the annotation management server 20 receives a "save" instruction from one of the client devices 50, the annotation management server 20 conducts annotation registration processing as described below when the annotation to be saved is a label annotation.

First, the client device 50 provides the annotation management server 20 with position information representing the position where the annotation to be saved has been added, a display name of the annotation and a link in a case where a link is attached to the annotation, a document ID of the document to which the annotation has been added and a terminal ID of the client device 50 instructing the saving. At this time, the client device 50 also provides the annotation management server 20 with a public attribute relating to the annotation to be saved, a status representing the status (new, existing, deleted) of the annotation and the date and time when the annotation was added.

Then, the annotation management server 20 saves the annotation ID, the terminal ID, the document ID, the position information, the display name, the link, the public attribute, the status and the date and time of creation in a table format in the label-use annotation database DB2. At this time, the structure of the data in the label-use annotation database DB2 is as shown in FIG. 4, for example.

As shown in FIG. 4, the annotation IDs are for managing individual annotations, and a unique ID number is allocated to each annotation. Here, the annotation IDs may be issued by the client system 94 or by the annotation management server 20. It is at least necessary for the pair of the annotation ID and the document ID to be unique. When the given annotation ID or the above pair is not new, the row in which the annotation ID or the above pair is described is overwritten.

The terminal ID is an ID number that uniquely identifies the client device 50. Here, there are cases where the terminal ID directly represents the hardware of the client device 50 that the user is using, and the terminal ID may correspond to the Internet Protocol (IP) address or host name. With respect to the document ID, a unique ID number is allocated to each document saved in the document database DB1. Here, the information processing system 90 is configured so that even if the same document file name is posted several times to the document database DB1, it is registered under different document IDs.

The position information is information representing the position where one annotation has been added. In the present embodiment, the position information is represented by a combination of the page number in the document represented by the corresponding document ID and the position coordinates in the page represented by that page number. In the present embodiment, the document display area 53C is divided into predetermined numbers of rectangular regions in the horizontal direction and the vertical direction (here, 20 in the horizontal direction and 25 in the vertical direction), numbers that continue in order in the horizontal direction from the upper left are given in advance to each divisional region, and these numbers are used as the position coordinates.

The display name of the annotation represents the comments described in the annotation (label), and the link represents link information associated with the annotation. In the information processing system 90 pertaining to the present embodiment, the link information is given as a path of a URL or a path to a directory as shown in FIG. 4, for example.

The user can set these display names and links for each annotation to be added. The display names and links can be set each time an annotation is added or each time an instruction to save an annotation is given.

The public attribute represents whether the annotation is to be made public (=Pub), is to be made public only to other specific users or within a group (=Frd), is not to be made public (is for personal use) (=Priv), or whether access is to be allowed only when authentication has been obtained (=Protect).

With respect to specific access (=Frd) and authenticated access (=Protect), sub-attributes such as user and group or authentication codes (user names and passwords) are settable. Also, in the case of specific access and authenticated access, access is not limited only to display (read-only). A sub-attribute of full-access that also allows editing by another person is settable. Of course, ordinarily, shared browsing of documents and annotations is for reading only. This is to prevent the occurrence of problems resulting from anyone being able to freely edit the documents and annotations. However, depending on the mode of use, there are cases where it is more convenient to enable others to freely edit the documents and annotations. In such a case, full access may be set.

The user can set these public attributes for each annotation to be added. The public attributes can be set each time an annotation is added or each time an instruction to save an annotation is issued. Also, an attribute may be set as a default, and the default attribute may be set when there is no instruction to update the attribute. When there is no instruction to update the public attribute at the time an annotation is saved, the attribute being set at that point in time may be handled.

In a case where access is to be allowed only when authentication has been obtained (=Protect), access is allowed only when password authentication has been obtained by a predetermined procedure. Then, when the annotations are to be displayed, the annotation management server 20 transmits all annotations including annotations that are not to be made public to the client system 94, and the client system 94 checks the public attributes set in the annotations and switches between displaying (making public) and not displaying (not making public) the annotations, or only the annotations to be made public are transmitted by the annotation management server 20.

The status represents whether the annotation has been newly created (=New), already exists (=Existing) or has been deleted (=Deleted). In a case where the user has deleted an added annotation with an electronic eraser or the like, the status of the annotation is "Deleted". In this case, the data of the deleted annotation does not disappear from the label-use annotation database DB2; rather, only the status is changed. Namely, in cases where there has been a change in the position, attribute or newly added time of an annotation, the annotation creation time prior to being changed, the annotation creation time after being changed and the deletion time of the deleted annotation (not shown) are registered/managed in the label-use annotation database DB2 for each annotation as annotation access histories.

Here, when the annotations are to be displayed, the annotation management server 20 transmits all annotations including "Deleted" annotations to the client system 94 and the client system 94 checks the statuses set in the annotations and switches between displaying and not displaying the annotations, or the annotation management server 20 transmits only the "Existing" annotations to the client system 94.

The date and time of creation are the date and time when one annotation has been added (drawn in the display area 53A) in the client device 50, and comprise the date and time. These are all managed in a server separately from the dates and times saved by designating the save button 74 on the client device 50 for each annotation.

With respect to annotations that have already been added, when the place of an annotation has been moved (i.e., when there has been a change in the position information) or when there has been a change in the public attribute of an annotation, the original annotation is practically regarded as having been deleted, the status of the annotation is changed to "Deleted", and a new annotation ID is issued in regard to the most recent status of the annotation. Thus, with respect to annotations that have been added, the annotation management server 20 transmits all annotations including "Deleted" annotations to the client system 94 even if an annotation has been deleted or changed, and the client system 94 checks the statuses of the annotations and switches between displaying and not displaying the annotations even with respect to annotations whose status is "Deleted", whereby an annotation can be reproduced in its original status if necessary.

The preceding has been a description in regard to a case where the annotations to be saved were label annotations, but when the annotations to be saved are handwritten-inputted annotations, the annotation management server 20 conducts annotation registration processing as described below.

First, the annotation management server 20 receives, from the client device 50, the annotation contents of the annotations to be saved, the position information and colors and shapes of those annotations, the document ID of the document to which the annotations have been added, and the terminal ID of the client device 50 instructing the saving. At this time, the annotation management server 20 also receives, from the client device 50, the public attributes relating to the annotations to be saved, the statuses (new, existing, deleted) of those annotations and the dates and times when the annotations were added.

Then, the annotation management server 20 saves the annotation ID, the terminal ID, the document ID, the position information, the annotation contents, the colors, the shapes, the public attributes, the statuses and the dates and times of creation in a table format in the pen input-use annotation database DB3. At this time, the structure of the data in the pen input-use annotation database DB3 is as shown in FIG. 5, for example.

As shown in FIG. 5, the annotation IDs, the terminal IDs, the document IDs, the position information, the public attributes, the status and the dates and times of creation are the same as those of the label-use annotation database DB2. However, the annotation IDs in the pen input-use annotation database DB3 are different from the annotation IDs in the label-use annotation database DB2 in that, whereas the annotation IDs registered in the label-use annotation database DB2 are allocated per label, the annotation IDs registered in the pen input-use annotation database DB3 are allocated per stroke.

The annotation contents in FIG. 5 are locus information of annotations of one stroke and are data used in order to reproduce drawn annotations. For example, the annotation contents are data such as bitmap and vector data. The colors and shapes are the colors of the ink used for the annotations and shape information representing circles and squares, for example. The line type represents the type of line, such as the thickness of the annotations, and whether the lines are solid lines or dotted lines.

When the client device 50 detects that the search button 76 has been designated in a state where a document is being displayed in the document display area 53C of the display unit 53, the client device 50 notifies the annotation management server 20 of information representing that fact. In response thereto, the annotation management server 20 reads, from the label-use annotation database DB2 and the pen input-use annotation database DB3, information relating to the annotation for which the search has been designated.

Namely, the annotation management server 20 handles "search" instructions from the client devices 50. At this time, the annotation management server 20 receives, from the client device 50, information relating to the document ID and the annotation adding range. Then, the annotation management server 20 searches the label-use annotation database DB2 and the pen input-use annotation database DB3 on the basis of this information (search conditions), reads information relating to annotations that can be displayed, and transmits this to the access source client device 50.

In response thereto, the client device 50 superposes and displays, on the document being browsed, the annotations represented by the information received from the annotation management server 20. In FIG. 2, an example is shown where label annotations 86 and handwritten-inputted annotations 88 are superposed and displayed on the document 84 by the above processing.

The client system 94 pertaining to the present embodiment includes a subjoinder annotation display function where, in a mode of use where plural users add annotations to a common electronic document using mutually different client devices 50, all of the client devices 50 that the users are using display, in real time, annotations that other users have added with other client devices 50.

Figure 6:
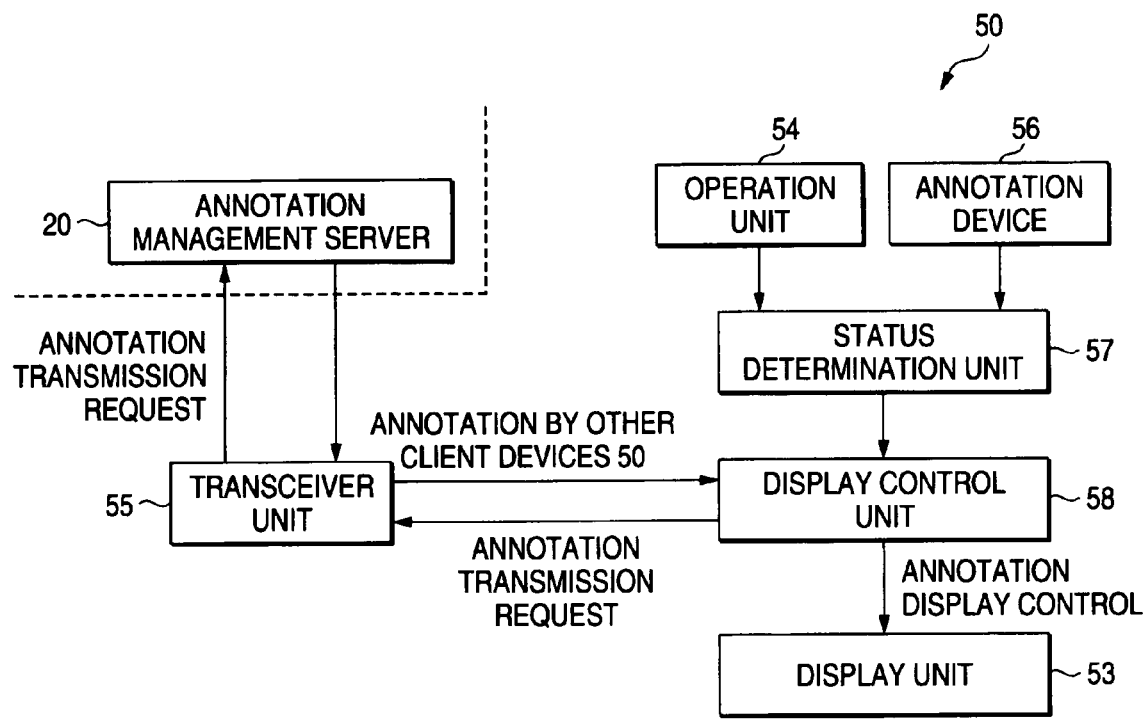
FIG. 6 is a block diagram showing the functional configuration of a client device for executing a subjoinder annotation display function pertaining to the embodiment of the invention.

FIG. 6 is a block diagram showing the functional configuration of the client device 50 for executing the subjoinder annotation display function.

As shown in FIG. 6, in order to execute the subjoinder annotation display function, each client device 50 includes a status determination unit 57, which determines whether or not the user is unhindered in referencing annotations added by another client device 50, and a display control unit 58, which controls the display unit 53 to display the annotations when it has been determined by the status determination unit 57 that the user is unhindered in referencing the annotations.

The status determination unit 57 pertaining to the present embodiment is configured to determine whether or not the referencing is unhindered on the basis of the status of an operation by the user with respect to the operation unit 54 and the annotation device 56.

In order to execute the subjoinder annotation display function, the annotation management server 20 pertaining to the present embodiment is configured to receive, from the client device 50, a signal (called an "annotation transmission request signal" below) requesting the transmission of information relating to annotations that have been newly added or corrected by other client devices 50. The annotation management server 20 also includes a function where, when the annotation management server 20 receives an annotation transmission request signal from one of the client devices 50, the annotation management server 20 searches and reads, from the label-use annotation database DB2 and the pen input-use annotation database DB3, information relating to annotations that have been newly added or corrected by client devices 50 other than the client device 50 transmitting the annotation transmission request signal, and transmits the information to the client device 50 transmitting the annotation transmission request signal.

Here, the client device 50 pertaining to the present embodiment transmits, to the annotation management server 20, an annotation transmission request signal together with a terminal ID for identifying itself and a document ID for identifying the document being referenced when it has been determined by the status determination unit 57 that the referencing is unhindered.

In response thereto, the annotation management server 20 transmits, to the client device 50 transmitting the annotation transmission request signal, information relating to annotations to which terminal IDs other than the received terminal ID have been allocated and annotations to which the received document ID has been allocated.

In response thereto, the client device 50 controls the display unit 53 with the display control unit 58 to display the annotations represented by the received information relating to the annotations.

As shown in FIG. 6, in the client device 50 pertaining to the present embodiment, the role of transmitting the annotation transmission request signal and receiving the information relating to the annotations corresponding thereto is allocated to the display control unit 58, but the client device 50 is not limited to this. For example, this role may also be allocated to the status determination unit 57. Moreover, a unit fulfilling this role may be disposed separately from the status determination unit 57 and the display control unit 58, and this unit may be configured to transmit the annotation transmission request signal and receive the information relating to the annotations and transmitted from the annotation management server 20 in response to the annotation transmission request signal.

Also, the information processing system 90 pertaining to the present embodiment has a configuration where, in order to identify annotations that have been newly added or corrected by a client device 50 other than the client device 50 transmitting the annotation transmission request signal, the client device 50 transmits, together with the annotation transmission request signal, the terminal ID representing the client device 50 transmitting the request signal and the document ID representing the document being referenced, and the annotation management server 20 narrows down, on the basis of the received terminal ID and the document ID, the annotations to be transmitted to the client device 50 transmitting the request signal (i.e., the annotations to be displayed by the client device 50), but the information processing system 90 is not limited to this.

For example, the information processing system 90 may also be configured so that the client device 50 transmits only the annotation transmission request signal and the document ID to the annotation management server 20, and the annotation management server 20 transmits, to the client device 50 transmitting the request signal, information relating to all annotations to which the received document ID has been allocated. The information processing system 90 may also be configured so that the client device 50 transmits only the annotation transmission request signal to the annotation management server 20, the annotation management server 20 transmits, to the client device 50 transmitting the request signal, information (including the document ID) relating to all annotations, and the client device 50 selects and displays only the annotations corresponding to the document ID allocated to the document that the client device 50 is displaying.

Incidentally, the client device 50 pertaining to the present embodiment may be configured so that the subjoinder annotation display function is realized by software by executing a subjoinder annotation display processing program.

Figure 7:
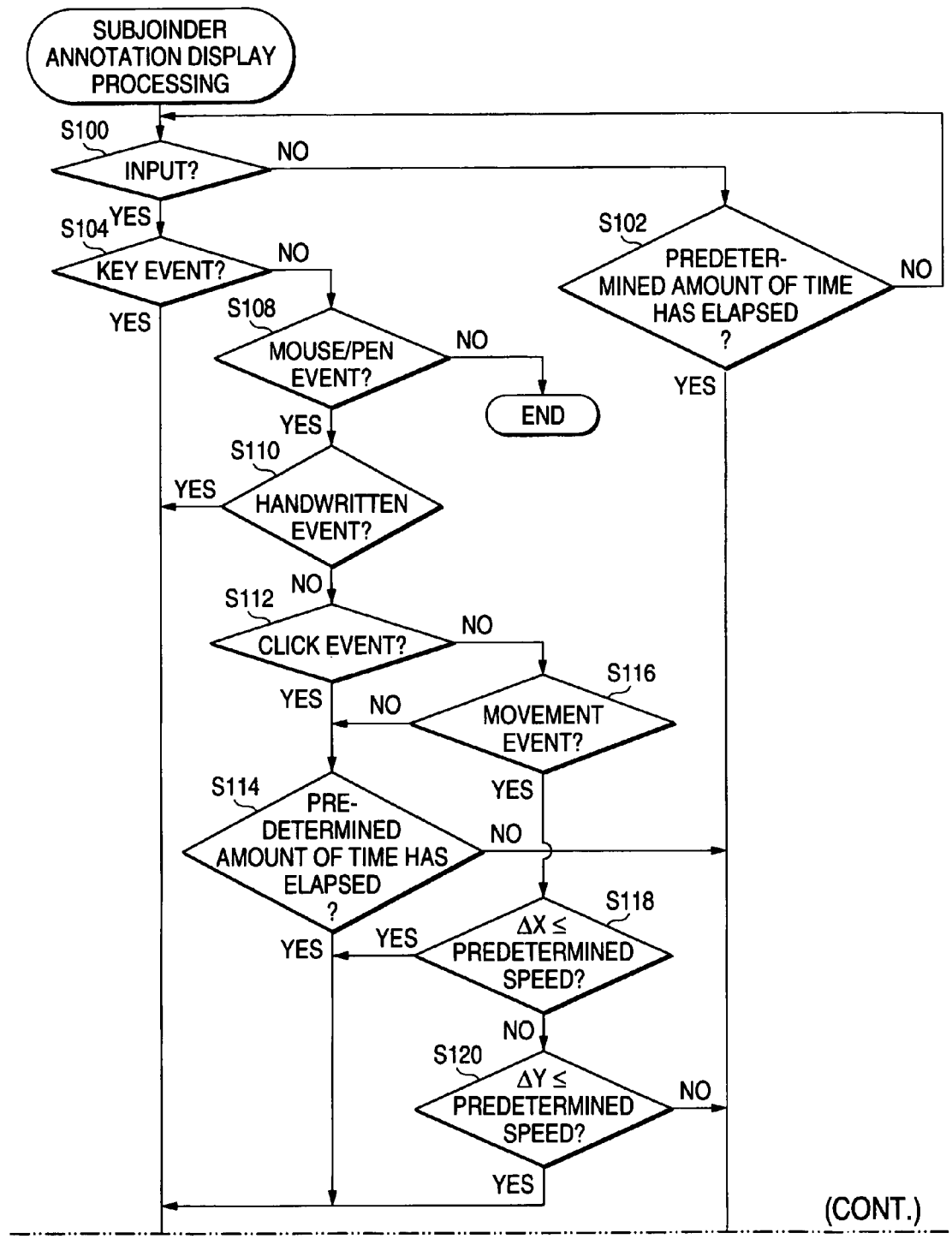
FIG. 7 is a flow chart showing the flow of processing of a subjoinder annotation display processing program pertaining to the embodiment of the invention.

Next, the action of the client device 50 when the subjoinder annotation display function is executed will be described in detail with reference to FIG. 7. FIG. 7 is a flow chart showing the flow of processing of a subjoinder annotation display processing program executed every predetermined amount of time (here, one second) in the control unit 51 of the client device 50 when executing the subjoinder annotation display function. This program is stored in advance in a predetermined region of the primary storage unit 52.

First, in step 100, it is determined whether or not an event generated by an operation with respect to the operation unit 54 or by a handwritten-inputted operation with the annotation device 56 has been detected, whereby it is determined whether or not an operation with respect to the operation unit 54 or a handwritten-inputted operation has been conducted by the user. When the determination is NO, the program moves to step 102, and when the determination is YES, the program moves to step 104.

In step 102, it is determined whether or not a predetermined amount of time has elapsed (here, one minute) in a state where an operation with respect to the operation unit 54 or a handwritten-inputted operation is not conducted. When the determination is NO, the program returns to step 100. When the determination is YES, it is determined that the user has not conducted an input operation within the predetermined amount of time and that the user is unhindered in referencing the annotations with the subjoinder annotation display function. Then, the program moves to step 122 where the fact that display of the annotations is possible is set (called "displayable setting processing" below). Thereafter, the program moves to step 124. In the present embodiment, the displayable setting processing in step 122 is conducted by setting a predetermined value (here, "1") in a predetermined flag F.

In step 104, it is determined whether or not the event detected in step 100 is a key event generated when the keyboard of the operation unit 54 is operated. When the determination is YES, it is determined that the user has inputted text with the keyboard and that the user is hindered in referencing the annotations with the subjoinder annotation display function. Then, the program moves to step 106 where the fact that display of the annotations is impossible is set (called "undisplayable setting processing" below). Thereafter, the program moves to step 124. In the present embodiment, the undisplayable setting processing in step 106 is conducted by setting, in the flag F, a value (here, "0") that is different from the aforementioned predetermined value.

When the determination in step 104 is NO, the program moves to step 108 where it is determined whether or not the event detected in step 100 is a mouse event generated when the mouse of the operation unit 54 is operated or a pen event generated when handwritten input is conducted with the annotation device 56. When the determination is NO, it is determined that the event detected in step 100 is an unexpected event and the subjoinder annotation display processing program ends. When the determination is YES, the program moves to step 110.

In step 110, it is determined whether or not the event detected in step 100 is a handwritten event resulting from the mouse or annotation device 56. When the determination is YES, it is determined that the user has handwritten something with the mouse or annotation device 56 and that the user is hindered in referencing the annotations with the subjoinder annotation display function. Then, the program moves to step 106, where the aforementioned undisplayable setting processing is executed, and the program moves to step 124. The above-described "handwritten event" means that a button event generates, just before the handwritten event, which shows that a button provided in a mouse is depressed and a movement event generates which shows a movement of a mouse with the button event generated, or a pen-down event for showing a contact of the annotation device 56 on a display surface of the display unit 53 generates just before the movement event and a movement event for showing a movement of the annotation device 56 generates with the pen-down event generated.

When the determination in step 110 is NO, the program moves to step 112 where it is determined whether or not the event detected in step 100 is a click event representing that the generation period of the button event or the pen-down event is within a predetermined short amount of time (here, point three seconds). When the determination is YES, the program moves to step 114.

In step 114, it is determined whether or not a predetermined amount of time (here, one second) has elapsed since the point in time when the click event is detected by the previous processing of step 112. When the determination is NO, it is determined that the user has unintentionally repeated a click operation with the mouse or annotation device 56 and that the user is unhindered in referencing the annotations with the subjoinder annotation display function. Then, the program moves to step 122, where the displayable setting processing is executed, and the program moves to step 124. When the determination in step 114 is YES, it is determined that the user has intentionally made a click operation with the mouse or annotation device 56 and that the user is hindered in referencing the annotations with the subjoinder annotation display function. Then, the program moves to step 106, where the aforementioned undisplayable setting processing is executed, and the program moves to step 124. It will be noted that, when the subjoinder annotation display processing program is initially executed after the power of the client device 50 has been turned ON, the program is configured to unconditionally move to step 106 when detection of the previous click event is not being conducted at the time of the processing of step 114.

When the determination in step 112 is NO, the program moves to step 116 where it is determined whether or not the event detected in step 100 is a movement event with the mouse or annotation device 56. When the determination is NO, the program moves to step 114, and when the determination is YES, the program moves to step 118.

In step 118, it is determined whether or not a moving speed ΔX in the horizontal direction corresponding to the detected movement event is equal to or less than a predetermined speed (here, ten pixels/second). When the determination is YES, it is determined that the user has made a movement operation in the horizontal direction with the mouse or annotation device 56 equal to or less than the predetermined speed and that the user is hindered in referencing the annotations with the subjoinder annotation display function. Then, the program moves to step 106, where the aforementioned undisplayable setting processing is executed, and the program moves to step 124.

When the determination in step 118 is NO, the program moves to step 120 where it is determined whether or not a moving speed ΔY in the vertical direction corresponding to the detected movement event is equal to or less than a predetermined speed (here, ten pixels/second). When the determination in step 120 is YES, it is determined that the user has conducted a movement operation in the vertical direction with the mouse or annotation device 56 equal to or less than a predetermined speed and that the user is hindered in referencing the annotations with the subjoinder annotation display function. Then, the program moves to step 106, where the aforementioned undisplayable setting processing is executed, and the program moves to step 124.

When the determination instep 120 is NO, it is determined that the user has conducted a movement operation with the mouse or annotation device 56 at a speed exceeding the predetermined speed in both the horizontal direction and the vertical direction and that the user is unhindered in referencing the annotations with the subjoinder annotation display function. Then, the program moves to step 122, where the aforementioned displayable setting processing is executed, and the program moves to step 124.

Due to the processing of steps 100 to 122, it can be determined whether or not the user is unhindered in referencing the annotations with the subjoinder annotation display function, and the display of the annotations can be set (switched) in response to the determination result.

In step 124, it is determined whether or not the value of the flag F is the aforementioned predetermined value, whereby it is determined whether or not the user is unhindered in the referencing of the annotations with the subjoinder annotation display function. When the determination is YES, the program moves to step 126 where the client device 50 transmits the annotation transmission request signal to the annotation management server 20. In step 128, the client device 50 waits to receive the information relating to the annotations corresponding to the annotation transmission request signal.

In step 130, the display unit 53 is controlled to display, in the document display area 53C, the annotations represented by the information received via the transceiver unit 55 from the annotation management server 20 in step 128. Thereafter, the subjoinder annotation display processing program ends.

When the determination in step 124 is NO, the subjoinder annotation display processing program ends without executing the processing of steps 126 to 130.

Figure 8:
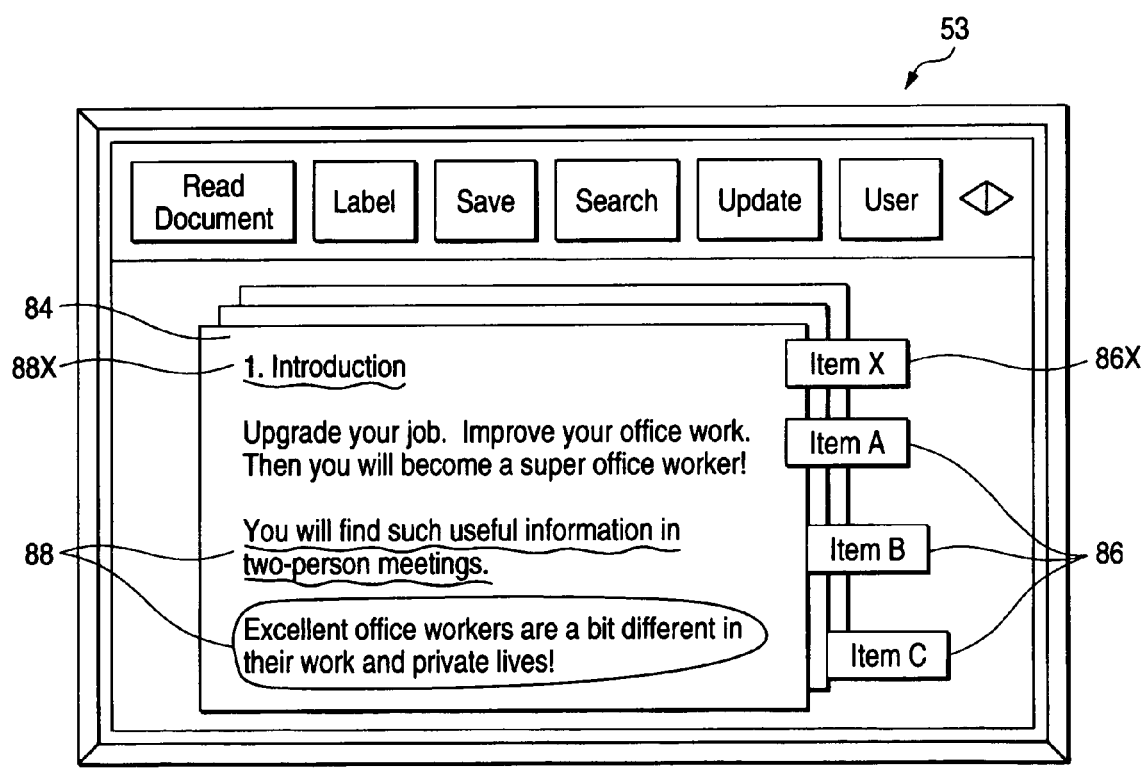
FIG. 8 is a schematic diagram showing an example of the display of annotations resulting from the subjoinder annotation display processing program pertaining to the embodiment of the invention.

FIG. 8 shows an example of a display of the display unit 53 resulting from the processing of step 130 in a case where the display of the display unit 53 prior to the execution of the subjoinder annotation display processing program is as shown in FIG. 2. In this case, a label annotation 86X and a handwritten-inputted 88X have been newly added by another client device 50.

The processing of steps 126 and 128 of the subjoinder annotation display processing program corresponds to an acquisition step of the invention, the processing of steps 100 to 120 excluding step 106 corresponds to a status determination step of the invention, and the processing of step 130 corresponds to a display control step of the invention.

As described in detail above, in the present embodiment, the information processing apparatus is configured to determine whether or not the user is unhindered in referencing additional information (here, the label annotations 86 and the handwritten-inputted annotations 88) added by another information processing apparatus (here, the client device 50) and to display the additional information when it is determined that the user is unhindered in the referencing. Thus, the information processing apparatus can appropriately switch between displaying and not displaying the additional information added by another user without entailing a cumbersome operation.

Also, in the present embodiment, the information processing apparatus is configured to determine whether or not the user is unhindered in the referencing on the basis of a status of an operation with respect to an operation unit (here, the operation unit 54 and the annotation device 56) that is operated when inputting predetermined information relating to a display image (here, the document 84) resulting from a display unit (here, the display unit 53). Thus, the information processing apparatus can determine the status without requiring new hardware such as a camera or sensor for shooting the status of the user, and the invention can be realized at a low cost.

Also, in the present embodiment, both a text input device (here, the keyboard) that is operated when inputting text information relating to the display image and a coordinate input device (here, the mouse and the annotation device 56) that is operated when inputting coordinate information representing a position in the display image are used as the operation unit. Thus, the status of an operation with respect to the operation unit can be easily grasped on the basis of only the occurrence of an event generated in response to an operation with these input devices.

Also, in the present embodiment, a status determination unit determines that the user is unhindered in the referencing when the operation with respect to the text input device and the coordinate input device is not conducted in a period of time equal to or greater than a predetermined period of time and when an operation amount (here, the moving speeds $\Delta X$ and $\Delta Y$) per predetermined period of time with respect to the coordinate input device exceeds a predetermined speed. Thus, the additional information can be appropriately displayed at a timing when the user is clearly unhindered in the referencing of the additional information by another information processing apparatus in a state where the operation by the user is not being conducted in a period of time equal to or greater than a predetermined period of time and when an operation by the user is being conducted while exceeding a predetermined speed.

The invention has been described using an embodiment, but the technical scope of the invention is not limited to the scope described in the embodiment. Many modifications and improvements can be made to the embodiment in a range that does not deviate from the gist of the invention, and such modifications and improvements are included in the technical scope of the invention.

The preceding embodiment is not intended to limit the invention, and all combinations of characteristics described in the embodiment are not essential to the realization of the invention. Inventions of various stages are included in the embodiment, and various inventions can be extracted by appropriately combining several of the disclosed constituent elements. Even if some constituent elements are omitted from all of the constituent elements described in the embodiment, configurations from which those constituent elements have been omitted can be extracted as inventions as long as effects are obtained.

For example, in the preceding embodiment, a case is described where the handwritten input by the annotation device 56 is realized with a touch panel, but the invention is not limited to this. For example, the handwritten input can also be realized by an electromagnetic induction type detection mechanism. In this case also, the same effects as those of the embodiment can be obtained.

Also, in the preceding embodiment, a case is described where the handwritten input is realized using a pen type annotation device 56, but the invention is not limited to this. For example, the handwritten input can also be realized using an input/instruction device such as a keyboard or mouse. In this case, the information processing system 90 can be constructed at a low cost because it becomes unnecessary to use tablet PCs as the client devices 50.

Also, in the present embodiment, a case is described where the invention is applied to a client/server system, but the invention is not limited to this. For example, the invention can also be applied to a peer-to-peer (P2P) system. Here, when the invention is applied to a P2P system, the processing of the server system 92 and the client system 94 described in the preceding embodiment is executable in each client device. In this case also, effects that are the same as those of the embodiment can be obtained.

Also, in the present embodiment, a case is described where the document management server 10 and the annotation management server 20 are separately configured, but the invention is not limited to this. For example, the invention can also be configured so that the functions of both servers are realized in a single (stand alone) information processing apparatus such as a PC or workstation. In this case also, effects that are the same as those of the embodiment can be obtained.

Also, in the present embodiment, a case is described where the processing executing the subjoinder annotation display function is realized with software, but the invention is not limited to this. For example, the processing can also be realized with hardware. Examples in this case include disposing, in the client devices 50, a functional device that acts in the same manner as the status determination unit 57 and the display control unit 58 shown in FIG. 6 as an example. In this case, an increase in the speed of the subjoinder annotation display function can be expected in comparison to the present embodiment.

Also, in the present embodiment, a case is described where thresholds such as the predetermined amount of time and the predetermined speeds used in the subjoinder annotation display processing program are set in advance, but the invention is not limited to this. These thresholds can also be appropriately set and changed by the user. Thus, the convenience can be improved.

Also, the structures of the data in each database (see FIGS. 3 to 5) described in the present embodiment are only examples, and items to be stored may be added and unnecessary items may be deleted as necessary. The storage content of each item can also be appropriately changed. For example, with respect to the label-use annotation database DB2 shown in FIG. 4, the "link information" and the "public information" are not invariably necessary and can be deleted.

Moreover, in terms of constructing the systems, the manner in which the functional elements are distributed in the server system 92 and the client system 94 is not limited to that described in the present embodiment. The functional elements may be distributed in a convenient manner in terms of constructing the systems.

As described above, some embodiments of the invention are outlined below.

According to an embodiment of the invention, an information processing apparatus includes an additional information adding function that adds additional information to an electronic document, the information processing apparatus comprising: a display unit that displays the electronic document and the additional information added to the electronic document; an acquisition unit that acquires, in a state where the electronic document is being displayed by the display unit, additional information added to the electronic document by another information processing apparatus including the additional information adding function; a status determination unit that determines whether or not the user is unhindered in referencing the additional information added by the other information processing apparatus; and a display control unit that controls the display unit to display the additional information acquired by the acquisition unit when it has been determined by the status determination unit that the user is unhindered in the referencing.

According to this embodiment, the information processing apparatus includes an additional information adding function that adds additional information (annotations) to an electronic document and a display unit that displays the electronic document and the additional information added to the electronic document. In a state where the electronic document is being displayed by the display unit, additional information added to the electronic document by another information processing apparatus including the additional information adding function is acquired by an acquisition unit. Examples of the display unit include a display such as a liquid crystal display, a plasma display, an organic electroluminescence (EL) display and a cathode ray tube (CRT) display. Examples of the acquisition of the additional information by the acquisition unit include acquiring the additional information from an outside device through a communications network such as an intranet, the Internet, and a local area network (LAN).

Here, whether or not the user is unhindered in referencing the additional information added by the other information processing apparatus is determined, in the invention, by a status determination unit. The display unit is controlled by a display control unit so that the additional information acquired by the acquisition unit is displayed when it is determined that the user is unhindered in the referencing.

The information processing apparatus of this embodiment is configured to determine whether or not the user is unhindered in referencing the additional information added by the other information processing apparatus and to display the additional information when it is determined that the user is unhindered in the referencing. Thus, the information processing apparatus can appropriately switch between displaying and not displaying additional information added by another user without entailing a cumbersome operation.

The information processing apparatus according to another embodiment of the invention may further comprise an operation unit that is operated when inputting predefined format of information relating to a display image resulting from the display unit, and the status determination unit may be configured to determine whether or not the user is unhindered in the referencing on the basis of a status of an operation with respect to the operation unit.

Moreover, the operation unit may comprise at least one of a text input device that is operated when inputting text information relating to the display image and a coordinate input device that is operated when inputting coordinate information representing a position in the display image. Here, examples of the text input device include a keyboard. Examples of the coordinate input device include pointing devices such as a touch panel, a mouse, a trackball, a digitizer and a tablet.

Moreover, according to another embodiment of the invention the operation unit may comprise both the text input device and the coordinate input device, and the status determination unit may be configured to determine that the user is unhindered in the referencing when the operation with respect to the text input device and the coordinate input device is not conducted in a period of time equal to or greater than a predetermined period of time and when an operation amount per predetermined period of time with respect to the coordinate input device exceeds a predetermined amount.

According to another embodiment of the invention, there is provided an information processing method of an information processing apparatus including an additional information adding function that adds additional information to an electronic document, a display unit that displays the electronic document and the additional information added to the electronic document and an acquisition unit that acquires, in a state where the electronic document is being displayed by the display unit, additional information added to the electronic document by another information processing apparatus including the additional information adding function, the information processing method comprising: determining whether or not the user is unhindered in referencing the additional information added by the other information processing apparatus; and controlling the display unit to display the additional information acquired by the acquisition unit when it has been determined that the user is unhindered in the referencing.

Because the information processing method of this embodiment acts in the same manner as the information processing apparatus described above, the information processing method can, in the same manner as the information processing apparatus, appropriately switch between displaying and not displaying additional information added by another user without entailing a cumbersome operation.

According to another embodiment of the invention the information processing method may be configured so that it is determined whether or not the user is unhindered in the referencing on the basis of a status of an operation with respect to an operation unit that is operated when inputting predetermined information relating to a display image resulting from the display unit.

According to another embodiment of the invention, there is provided a recording medium in which an information processing program is recorded which conducts display control with respect to a display unit of an information processing apparatus including an additional information adding function that adds additional information to an electronic document and a display unit that displays the electronic document and the additional information added to the electronic document, the information processing program causing a computer to execute: an acquisition step of acquiring, in a state where the electronic document is being displayed by the display unit, additional information added to the electronic document by another information processing apparatus including the additional information adding function; a status determination step of determining whether or not the user is unhindered in referencing the additional information added by the other information processing apparatus; and a display control step of controlling the display unit to display the additional information acquired by the acquisition step when it has been determined by the status determination step that the user is unhindered in the referencing.

Because the information processing program recorded in the recording medium of this embodiment causes a computer to act in the same manner as the information processing apparatus described above, the information processing program can, in the same manner as the information processing apparatus, appropriately switch between displaying and not displaying additional information added by another user without entailing a cumbersome operation.

According to another embodiment of the invention the information processing program stored in the recording medium may be configured so that, in the status determination step, it is determined whether or not the user is unhindered in the referencing on the basis of a status of an operation with respect to an operation unit that is operated when inputting predefined format of information relating to a display image resulting from the display unit.

According to an embodiment of the invention, effects are obtained in that, because it is determined whether or not the user is unhindered in referencing the additional information added by another information processing apparatus, with the additional information being displayed when it is determined that the user is unhindered in the referencing, it can be performed to appropriately switch between displaying and not displaying the additional information added by another user without entailing a cumbersome operation.

The foregoing description of the embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

FIG. 1
90 INFORMATION PROCESSING SYSTEM
92 SERVER SYSTEM
10 DOCUMENT MANAGEMENT SERVER
11 CONTROL UNIT
12 PRIMARY STORAGE UNIT
13 DISPLAY UNIT
14 OPERATION UNIT
15 SECONDARY STORAGE UNIT
16 TRANSCEIVER UNIT
20 ANNOTATION MANAGEMENT SERVER
21 CONTROL UNIT
22 PRIMARY STORAGE UNIT
23 DISPLAY UNIT
24 OPERATION UNIT
25 SECONDARY STORAGE UNIT
26 TRANSCEIVER UNIT
60 NETWORK
50 CLIENT DEVICE
51 CONTROL UNIT
52 PRIMARY STORAGE UNIT
53 DISPLAY UNIT
54 OPERATION UNIT
55 TRANSCEIVER UNIT
50 CLIENT
94 CLIENT SYSTEM

FIG. 2
53 DISPLAY UNIT
70 READ DOCUMENT
72 LABEL
74 SAVE
76 SEARCH
78 UPDATE
80 USER
53B BUTTON DISPLAY AREA
53A DISPLAY AREA
53C DOCUMENT DISPLAY AREA
84 DOCUMENT
86 ITEM A
86 ITEM B
86 ITEM C

1. INTRODUCTION
   UPGRADE YOUR JOB. IMPROVE YOUR OFFICE WORK. THEN YOU WILL BECOME A SUPER OFFICE WORKER!
   YOU WILL FIND SUCH USEFUL INFORMATION IN TWO-PERSON MEETINGS.
   EXCELLENT OFFICE WORKERS ARE A BIT DIFFERENT IN THEIR WORK AND PRIVATE LIVES!

FIG. 3
DOCUMENT DATABASE DB1
DOCUMENT ID
DOCUMENT NAME
DOCUMENT BODY
   1. INTRODUCTION
   THIS MATERIAL . . .
   THE BUDGET FOR THIS FISCAL YEAR . . .

FIG. 4
LABEL-USE ANNOTATION DATABASE DB2
ANNOTATION ID
TERMINAL ID
DOCUMENT ID
POSITION INFORMATION
DISPLAY NAME
   ITEM A
   ITEM B
   ITEM C
LINK
PUBLIC ATTRIBUTE
STATUS
DATE AND TIME CREATED

FIG. 5
PEN INPUT-USE ANNOTATION DATABASE DB3
ANNOTATION ID
TERMINAL ID
DOCUMENT ID
POSITION INFORMATION
ANNOTATION CONTENT
   IMAGE INFORMATION 1
   IMAGE INFORMATION 2
   IMAGE INFORMATION 3
COLOR AND SHAPE
   RED, SQUARE
   YELLOW
   YELLOW
LINE TYPE
   NARROW 1
   EXTRA THICK 1
   EXTRA THICK 1
PUBLIC ATTRIBUTE
STATUS
DATE AND TIME CREATED

FIG. 6
50 CLIENT DEVICE
20 ANNOTATION MANAGEMENT SERVER
ANNOTATION TRANSMISSION REQUEST
ANNOTATION BY ANOTHER CLIENT DEVICE 50
55 TRANSCEIVER UNIT
ANNOTATION TRANSMISSION REQUEST
54 OPERATION UNIT
56 ANNOTATION DEVICE
57 STATUS DETERMINATION UNIT
58 DISPLAY CONTROL UNIT
ANNOTATION DISPLAY CONTROL
53 DISPLAY UNIT

FIG. 7
SUBJOINDER ANNOTATION DISPLAY PROCESSING
100 IS THERE INPUT?
102 HAS PREDETERMINED AMOUNT OF TIME ELAPSED?
104 KEY EVENT?
106 UNDISPLAYABLE SETTING
108 MOUSE/PEN EVENT?
   END

110 HANDWRITTEN EVENT?
112 CLICK EVENT?
114 HAS PREDETERMINED AMOUNT OF TIME ELAPSED?
116 MOVEMENT EVENT?
118 ΔX≦PREDETERMINED SPEED?
120 ΔY≦PREDETERMINED SPEED?
122 DISPLAYABLE SETTING
124 DISPLAYABLE?
126 INSTRUCT TRANSMISSION OF ANNOTATIONS
128 PREDETERMINED INFORMATION RECEIVED?
130 DISPLAY ANNOTATIONS
END

FIG. 8
53 DISPLAY UNIT
READ DOCUMENT
LABEL
SAVE
SEARCH
UPDATE
USER
84 DOCUMENT
86X ITEM X
86 ITEM A
86 ITEM B
86 ITEM C

1. INTRODUCTION,
   UPGRADE YOUR JOB. IMPROVE YOUR OFFICE WORK. THEN YOU WILL BECOME A SUPER OFFICE WORKER!
   YOU WILL FIND SUCH USEFUL INFORMATION IN TWO-PERSON MEETINGS.
   EXCELLENT OFFICE WORKERS ARE A BIT DIFFERENT IN THEIR WORK AND PRIVATE LIVES!

What is claimed is:

1. An information processing apparatus comprising:
   an additional information adding unit that adds additional information to an electronic document;
   a display that displays the electronic document and the additional information added to the electronic document;
   an acquisition unit that acquires, based on an annotation transmission request, in a state where the electronic document is being displayed by the display unit, additional information added to the electronic document by another information processing apparatus;
   a status determination unit that determines whether or not a user is unhindered in referencing the additional information added by the other information processing apparatus, based on a status of an operation by the user with respect to an annotation device and an operation unit; and
   a display control unit that controls the display to display the additional information acquired by the acquisition unit if it has been determined by the status determination unit that the user is unhindered in the referencing, wherein
   if the user does not supply an input for display in said electronic document for a threshold amount of time for said electronic document that is displayed to the user, said additional information added by said another information processing apparatus is set to be displayed to the user by setting a value in a predetermined flag, and
   if the user does supply the input within said threshold amount of time, said additional information is inhibited from being displayed to the user, wherein whether said input has been supplied is determined based on an occurrence of an event comprising at least one of (a) a key event, (b) a handwritten event, (c) a click event that does not occur within an expiration of a predetermined time, and (d) a movement event that does not exceed a predetermined speed,
   wherein said additional information is added by another user for display in a collaborative work environment, and wherein when a plurality of users each independently annotate a common portion of said electronic document, said annotation by each of said users is associated with a body of said electronic document, and registered in advance, and further wherein editing of a document is not inhibited.

2. The information processing apparatus according to claim 1, wherein the status determination unit determines whether or not the user is unhindered in referencing the additional information based on a public attribute of the additional information as well as based on the status of the operation by the user.

3. The information processing apparatus according to claim 1, wherein the status determination unit determines whether or not the user is unhindered in referencing the additional information based on a user name and/or user's password as well as based on the status of the operation by the user.

4. The information processing apparatus according to claim 1, wherein
   the operation unit is operated when inputting information of a predefined format relating to a display image resulting from the display unit.

5. The information processing apparatus according to claim 4, wherein the operation unit comprises at least one of a text input device that is operated when inputting text information relating to the display image and a coordinate input device that is operated when inputting coordinate information representing a position in the display image.

6. The information processing apparatus according to claim 5, wherein
   the operation unit comprises both the text input device and the coordinate input device.

7. The information processing apparatus according to claim 5, wherein
   the operation unit comprises both the text input device and the coordinate input device, and
   the status determination unit determines that the user is unhindered in the referencing when the operation with respect to the text input device and the coordinate input device is not conducted in a period of time equal to or greater than a first predetermined period of time and when an operation amount per second predetermined period of time with respect to the coordinate input device exceeds a predetermined amount.

8. The information processing apparatus according to claim 5, wherein
   the operation unit comprises both the text input device and the coordinate input device, and
   the status determination unit determines that the user is unhindered in the referencing when the operation with respect to the text input device is not conducted in a period of time equal to or greater than a predetermined period of time and when an operation amount per predetermined period of time with respect to the coordinate input device exceeds a predetermined amount.

9. The information processing apparatus according to claim 5, wherein
   the operation unit comprises both the text input device and the coordinate input device, and the status determination unit determines that the user is unhindered in the referencing when an operation amount per predetermined period of time with respect to the coordinate input device exceeds a predetermined amount.

10. The information processing apparatus according to claim 1, wherein the determination by the status determination unit regarding whether or not the user is unhindered in referencing the additional information is made actively as additional information is being acquired by the acquisition unit.

11. The information processing apparatus according to claim 1, wherein the determination by the status determination unit regarding whether or not the user is unhindered in referencing the additional information is made actively as additional information is being acquired by the acquisition unit, and wherein the user is not unhindered in referencing the additional information when an operation amount acquired from a coordinate input device per predetermined period of time exceeds a predetermined amount.

12. An information processing method comprising:
adding additional information to an electronic document;
displaying the electronic document and the additional information added to the electronic document;
acquiring, based on an annotation transmission request, and in a state where the electronic document is being displayed, additional information added to the electronic document by another information processing apparatus;
determining whether or not a user is unhindered in referencing the additional information added by the other information processing apparatus based on a status of an operation by the user with respect to an annotation device and an operation unit; and
controlling to display the additional information when it has been determined that the user is unhindered in the referencing, wherein
if the user does not supply an input for display in said electronic document for a threshold amount of time for said electronic document that is displayed to the user, said additional information added by said another information processing apparatus is set to be displayed to the user by setting a value in a predetermined flag, and
if the user does supply the input within said threshold amount of time, said additional information is inhibited from being displayed to the user, wherein whether said input has been supplied is determined based on an occurrence of an event comprising at least one of (a) a key event, (b) a handwritten event, (c) a click event that does not occur within an expiration of a predetermined time, and (d) a movement event that does not exceed a predetermined speed,
wherein said additional information is added by another user for display in a collaborative work environment, and wherein when a plurality of users each independently annotate a common portion of said electronic document, said annotation by each of said users is associated with a body of said electronic document, and registered in advance, and further wherein editing of a document is not inhibited.

13. The information processing method according to claim 12, wherein it is determined whether or not the user is unhindered in the referencing on the basis of the status of the operation when inputting information of a predefined format relating to a display image.

14. A storage medium readable by a computer, the storage medium storing a program of instructions executable by the computer to perform a function for processing information, the function comprising:
adding additional information to an electronic document;
displaying the electronic document and the additional information added to the electronic document;
acquiring, based on an annotation transmission request, and in a state where the electronic document is being displayed, additional information added to the electronic document by another information processing apparatus;
determining whether or not a user is unhindered in referencing the additional information added by the other information processing apparatus based on a status of an operation by the user with respect to an annotation device and an operation unit; and
controlling to display the additional information if it has been determined that the user is unhindered in the referencing, wherein
if the user does not supply an input for display in said electronic document for a threshold amount of time for said electronic document that is displayed to the user, said additional information added by said another information processing apparatus is set to be displayed to the user by setting a value in a predetermined flag, and
if the user does supply the input within said threshold amount of time, said additional information is inhibited from being displayed to the user, wherein whether said input has been supplied is determined based on an occurrence of an event comprising at least one of (a) a key event, (b) a handwritten event, (c) a click event that does not occur within an expiration of a predetermined time, and (d) a movement event that does not exceed a predetermined speed,
wherein said additional information is added by another user for display in a collaborative work environment, and wherein when a plurality of users each independently annotate a common portion of said electronic document, said annotation by each of said users is associated with a body of said electronic document, and registered in advance, and further wherein editing of a document is not inhibited.

15. The storage medium according to claim 14, wherein it is determined whether or not the user is unhindered in the referencing on the basis of the status of the operation when inputting information of a predefined format relating to a display image.

* * * * *